United States Patent [19]

De Shon

[11] Patent Number: 4,742,242

[45] Date of Patent: May 3, 1988

[54] BUOYANCY ENGINE UTILIZING LINKED LIFTING BODIES

[76] Inventor: Dennis Alan De Shon, P.O. Box 3255, Baton Rouge, La. 70821

[21] Appl. No.: 100,110

[22] Filed: Sep. 23, 1987

[51] Int. Cl.4 .............................................. F03B 9/00
[52] U.S. Cl. .................................... 290/54; 290/1 R; 415/5; 60/496
[58] Field of Search ..................... 290/1 R, 54; 415/5, 415/7; 416/7, 84; 417/62; 60/495, 496

[56] References Cited

U.S. PATENT DOCUMENTS

| | | | |
|---|---|---|---|
| 4,135,364 | 1/1979 | Busick | 290/54 |
| 4,326,132 | 4/1982 | Bokel | 290/1 R |
| 4,392,062 | 7/1983 | Bervig | 290/54 |

Primary Examiner—Bernard Roskoski

[57] ABSTRACT

A buoyancy engine having a wheel, incorporating recesses on its periphery to contain linked buoyant lifting bodies, is attached by arms to a driveshaft and immersed in a vessel of liquid. The driveshaft is rotably mounted on sealed bearings in the vessel walls. The buoyant lifting bodies are linked into a continuous loop by flexible attaching hinges. The lifting bodies are introduced at the base of the wheel through an injection tube. The injection tube contains air injectors, powered by a compressor or blower, and the volume of air injected is controlled by a computer controller programmed with the amount of air required to allow the injection of the lifting bodies into the vessel, without significant loss of liquid from the vessel. When operating, the lifting bodies are injected into the vessel at a point below the wheel, and are held by the recesses on the wheel during their ascent through the liquid. As lifting bodies reach the top of their ascent, they are routed out of the vessel, over idler pulleys to the base of the vessel and are reintroduced through the injection tube. The buoyancy of the lifting bodies thus attached to the wheel imparts an upward rotary motion to the wheel, which energy is transmitted via the driveshaft to rotate an electric generator. The driveshaft may also be connected to other devices or apparatus, should it be so desired.

1 Claim, 2 Drawing Sheets

BUOYANCY ENGINE UTILIZING LINKED LIFTING BODIES

BACKGROUND OF THE INVENTION

1. Field of the Invention

This invention relates generally to apparatus for producing power and relates more specifically to apparatus utilizing the buoyancy of gas-filled linked lifting bodies, introduced through a pressurized injection tube onto a wheel disposed in a vessel of liquid.

2. Description of the Prior Art

There have been various devices that have been proposed for producing power inexpensively, but these have not proven to be satisfactory.

SUMMARY OF THE INVENTION

The invention is comprised of a wheel with recesses designed into its periphery and which wheel is connected by a plurality of arms to a drive shaft. The drive shaft is mounted on sealed bearings in the walls of a vessel which contains a liquid, in this case, water, although other liquids such as mercury could be used. The vessel sits on a base which contains a compressor or blower, and a computer controller which meters compressed air into the vessel through injectors. Lifting bodies, containing a gas, in this case air, are connected in a continuous loop by flexible attaching hinges, and are injected into the vessel below the bottom of the wheel, through the injection tube. The lifting bodies are captured in the recesses of the wheel, their buoyancy imparting energy as rotational motion to the wheel and which energy is transmitted via the driveshaft, to rotate the generator, or other suitable device attached to the driveshaft. As the lifting bodies reach the top of their power producing ascent through the liquid, they are routed out of the vessel (rather than resubmerging them into the liquid at the top of the vessel, which would require the expenditure of energy to overcome their buoyancy) over idler pulleys mounted on the outside of the vessel, and downward to the base of the vessel where they are again introduced into the vessel. As they pass through the injection tube, the air injectors positioned around the inside of the injection tube inject that amount of air which will allow the introduction of the lifting bodies into the vessel without significant loss of liquid. At startup, the computer program actuates the air injectors so as to allow the filling of the vessel without loss of liquid through the injection tube.

OBJECTS AND ADVANTAGES OF THE INVENTION

It is an object of the invention to provide a power unit of this character to produce power over and above that produced for operation of the apparatus.

It is another object of the invention to provide apparatus of this character that is simple in construction and operation.

It is a further object of the invention to provide apparatus of this character that is relatively inexpensive to manufacture and maintain.

The characteristics and advantages of the invention are further sufficiently referred to in connection with the following detailed description of the accompanying drawings, which represent one embodiment.

After considering this example, skilled persons will understand that many variations may be made without departing from the principles disclosed and I contemplate the employment of any structure, arrangements or modes of operation that are properly within the scope of the appended claim.

BRIEF DESCRIPTION OF THE DRAWINGS

Referring to the drawings which are for illustrative purposes only.

DESCRIPTION OF THE PREFERRED EMBODIMENT

Figure 1:
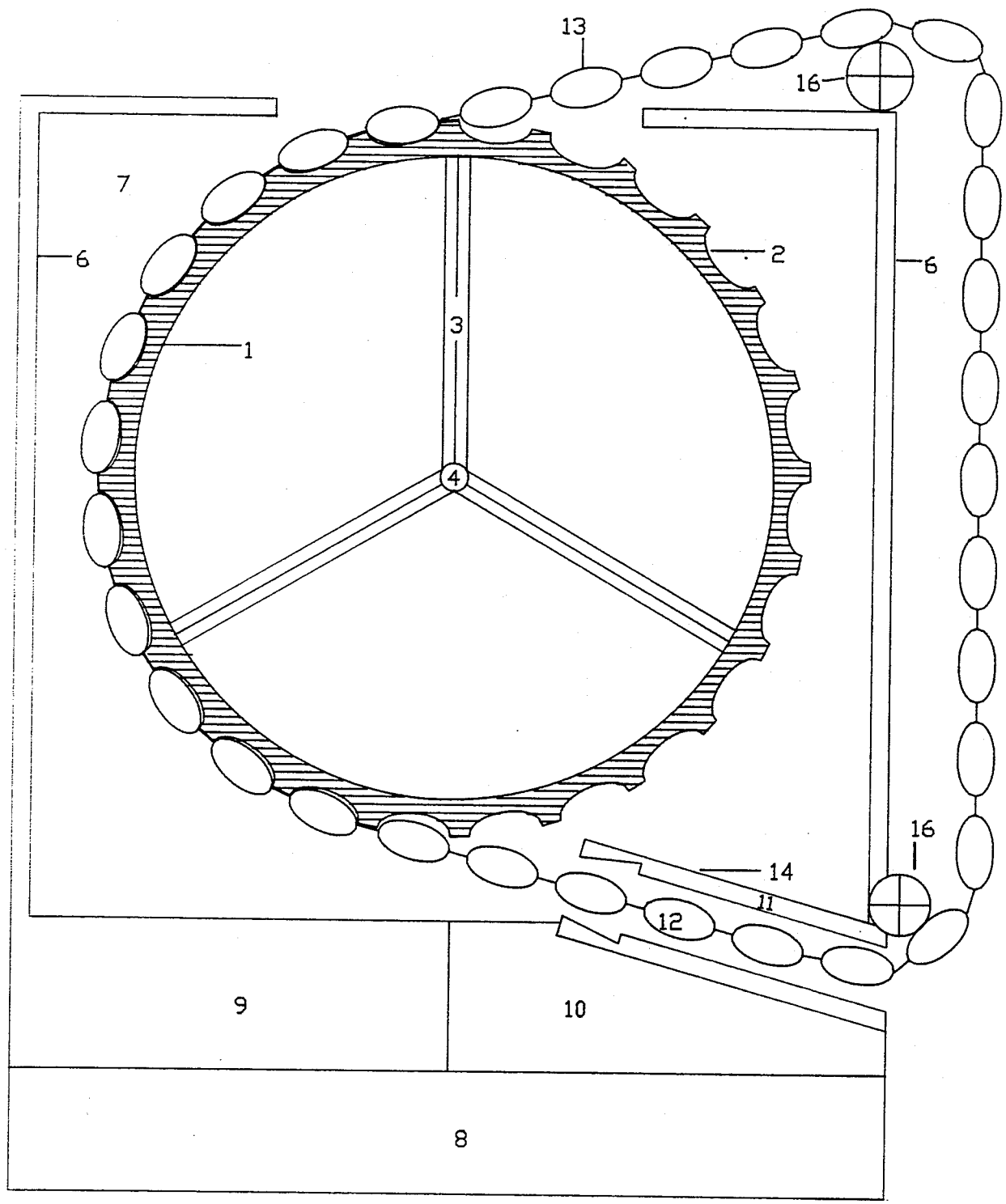
FIG. 1 is a schematic view of apparatus embodying the present invention, with the vessel walls cross sectioned to show the wheel, recesses, arms, lifting bodies, hinges, injection tube, and injectors.

Referring to FIG. 1, there is shown apparatus embodying the present invention. A wheel (1) with recesses (2) is connected by a plurality of arms (3) to a drive shaft (4) mounted on sealed bearings in the walls of a vessel (6), containing a liquid (7), in this case water, although other liquids such as mercury could be used. The vessel (6) sits on a base (8) which contains a compressor or blower (9), and a computer controller (10) which meters compressed air into the vessel through injectors (11). Lifting bodies (12) containing a gas, in this case air, are connected in a continuous loop by flexible attaching hinges (13), and are injected into the vessel below the bottom of the wheel, through the injection tube (14). The lifting bodies are captured in the recesses of the wheel, their buoyancy imparting a rotational upward motion to the wheel, and which energy is transmitted via the driveshaft to rotate the generator or other suitable device attached to the driveshaft. When operating, the lifting bodies, having reached the top of their power producing ascent through the liquid in the vessel, are routed outside of the liquid in the vessel, over idler pulleys (16) mounted on the outside of the vessel, and downward to the base of the vessel. The lifting bodies are reintroduced into the vessel through the injection tube. The injectors, positioned around the inside of the injection tube, inject that amount of air which will allow the reintroduction of the lifting bodies into the liquid in the vessel without significant loss of liquid from the vessel.

Figure 2:
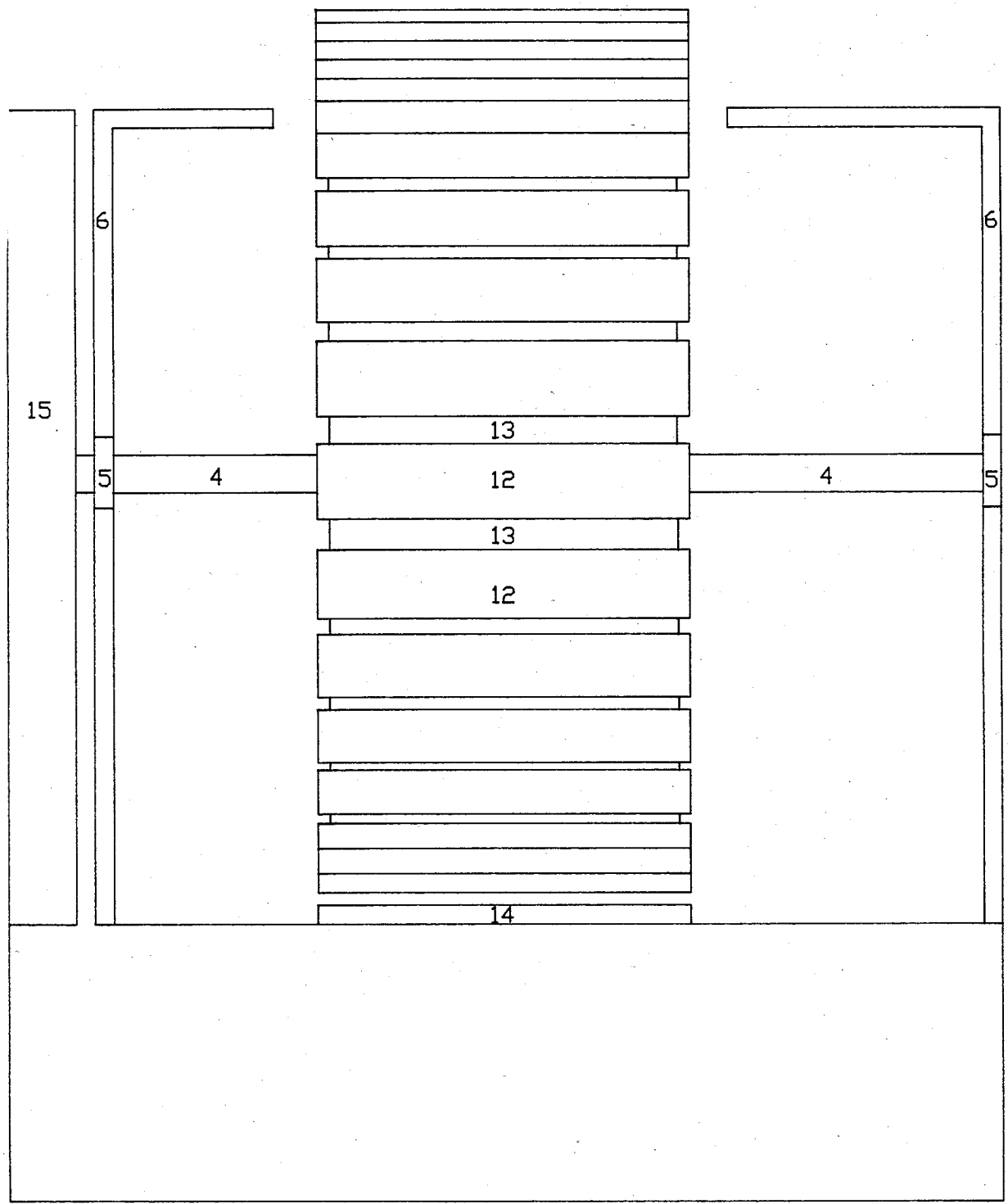
FIG. 2 is a side view of apparatus embodying the present invention, vessel walls cross-sectioned to show the drive shaft and sealed bearings.

Referring to FIG. 2, the driveshaft (4) is supported within the vessel on sealed bearings (5) mounted in the walls of the vessel. Energy developed by the engine is transmitted through the driveshaft producing power to rotate the electric generator (15). The driveshaft may be connected to other devices or apparatus, should it be so desired.

The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example; and I do not wish to be restricted to the specific form shown or uses mentioned except as defined in the accompanying claim.

I claim:

1. A buoyancy engine utilizing linked lifting bodies comprising:
    a wheel, immersed in a vessel containing a liquid, having recesses on its periphery which are designed to contain injected lifting bodies throughout their lifting ascent through the liquid, said wheel attached to the extreme ends of arms radially connected to a driveshaft, said wheel positioned at a distance from the driveshaft pivot point so as to increase the moment arm and torque produced, said driveshaft rotably mounted on sealed bearings in the walls of said vessel, and which is rotated by the upward motion of the wheel resulting from the buoyant force of the air contained in the injected lifting bodies, said lifting bodies connected in a continuous loop by flexible attaching hinges, idler pulleys mounted on the outside of said vessel, over which the continuous loop of lifting bodies are routed, after their power producing ascent, and prior to their reintroduction into the vessel, an injection tube positioned at the bottom of the vessel which introduces the lifting bodies into the vessel and onto the wheel, said injection tube containing on its inside surface air injectors which inject that amount of air into the vessel which allows the introduction of the lifting bodies, without significant loss of liquid from the vessel, said air injectors provided with compressed air from a compressor or blower, and which volume of air is metered by a computer controller, said computer controller programmed with the volume of air to be injected for a given volume of liquid in the vessel, said vessel sitting on a base, a generator attached to the driveshaft, which produces electric power from the rotation of the driveshaft.

* * * * *